US009002395B2

(12) United States Patent
Krukar

(10) Patent No.: US 9,002,395 B2
(45) Date of Patent: Apr. 7, 2015

(54) MESSAGE SUBSCRIPTION, GENERATION, AND DELIVERY WITH DYNAMIC ZONES

(76) Inventor: Richard Krukar, Albuquerque, NM (US)

( * ) Notice: Subject to any disclaimer, the term of this patent is extended or adjusted under 35 U.S.C. 154(b) by 490 days.

(21) Appl. No.: 13/300,686

(22) Filed: Nov. 21, 2011

(65) Prior Publication Data

US 2013/0130683 A1     May 23, 2013

(51) Int. Cl.
| | |
|---|---|
| *H04W 24/00* | (2009.01) |
| *H04L 12/58* | (2006.01) |
| *H04W 4/02* | (2009.01) |
| *H04W 60/00* | (2009.01) |
| *H04W 8/18* | (2009.01) |
| *H04W 4/06* | (2009.01) |

(52) U.S. Cl.
CPC ............... *H04L 51/20* (2013.01); *H04W 4/022* (2013.01); *H04W 60/00* (2013.01); *H04W 8/186* (2013.01); *H04W 4/06* (2013.01); *H04L 51/38* (2013.01)

(58) Field of Classification Search
None
See application file for complete search history.

(56) References Cited

U.S. PATENT DOCUMENTS

| 7,983,670 | B1 * | 7/2011 | Elliott ......................... 455/426.2 |
|---|---|---|---|
| 8,200,186 | B2 * | 6/2012 | Ashley et al. ............... 455/404.2 |
| 8,208,891 | B2 * | 6/2012 | Jacobs et al. ................ 455/404.1 |
| 8,213,977 | B2 * | 7/2012 | Klein et al. ..................... 455/519 |
| 2009/0233629 | A1 * | 9/2009 | Jayanthi ......................... 455/457 |
| 2010/0029245 | A1 * | 2/2010 | Wood et al. ................. 455/404.1 |
| 2011/0059748 | A1 * | 3/2011 | Taylor et al. ................ 455/456.1 |
| 2012/0316940 | A1 * | 12/2012 | Moshfeghi ................. 705/14.16 |

\* cited by examiner

*Primary Examiner* — Vladimir Magloire
*Assistant Examiner* — Frank Donado

(57) ABSTRACT

Text, voice, and video messaging techniques and social networks are enhanced with geolocation and permissions information. Basic messaging has a publisher publishing a message and subscribers receiving the message. Permissions can limit the publisher to publishing only into certain geographic zones. Recipients within a zone receive the message and other people or devices do not. Recipients can choose to subscribe to additional geographic zones to thereby receive messages directed into that zone. Publisher and subscriber zones do not need to cover the same geographic areas. Zones can be predefined or can be dynamically created, perhaps on a per message basis.

6 Claims, 14 Drawing Sheets

Center is transmission tower, cell tower, or a simple location.

zone can be 'world' or 'sol system' at anytime

```
         polyzone
           circleZone
             location, radius
           rectangleZone
701 ———      location, location
           polylineZone
             polyline (closed)
               location, location, ..., location
           pathZone
             polyline (usually open), radius
           blobZone
             location, location, ..., location
           timeZone
             location, deltaTime
```

Note: any zone can have an active period

MESSAGE SUBSCRIPTION, GENERATION, AND DELIVERY WITH DYNAMIC ZONES

Embodiments are related to text, audio, and video messaging, to geolocation, to notification systems, to user interfaces, to cloud services, to computer services, to cell phones, cell phone apps, to location aware devices, to client computers, and to computing devices.

BACKGROUND

Consumer grade messaging gained mass acceptance with the advent of SMS text messages on cell phones. SMS messages are limited to 140 characters and sent from one person to another person. Later advancements allowed people to send SMS messages to a group of recipients. Technological innovations such as social networks have allowed people to join groups, to follow certain personalities, and to subscribe to pages. The social networks are, in general, refinements of internet newsgroups and RSS (really simple syndication) readers.

Cell phones, smart phones in particular, provide individual people with small and surprisingly powerful portable computers. Most smart phones are also perpetually connected to at least one data network and are location aware. They know where they are and can report their locations. Furthermore, smart phones can run 'apps'. Most apps are simple computer programs that make use of the phone's hardware and services provided by the phone's operating system.

Location aware apps are available for smart phones. These apps include mapping and travel routing applications. Other available applications allow people to interact with each other based on proximity.

FIG. 1, labeled as 'prior art', illustrates proximity based interaction. A person 102 with a GPS (global positioning system) enabled cell phone can interact with a second person 104 within a certain radius 106. The radius 106 defines an area 101 bounded by a circle 105. A third person 103 outside the circle 105 is outside the area of interaction. The proximity based scheme has proven very effective in helping people find nearby goods, services, friends, and dates. Greater services are needed and they can be provided by systems and methods having capabilities above and beyond those based only on proximity to a sender.

BRIEF SUMMARY

Aspects of the embodiments address limitations and flaws in the prior art by introducing various types of geographic zones with different levels and types of permission.

It is therefore an aspect of the embodiments to provide a messaging system that communicates with location aware personal communications devices such as cell phones. Henceforth in this document, 'cell phone' or 'smart phone' and 'location aware personal communications device' will be used interchangeably. In general, these devices are carried by people, are connected to data networks, and know where they are either through GPS or through one of the other means that cell phones use to either precisely or approximately find their location.

It is another aspect of the embodiments to store zone specifications in a database on a server. A server can be a single network connected computer or a set of networked computers that cooperate to act as a server. The database stores a variety of information It is yet another aspect of the embodiments that a device registration module registers cell phones with the messaging system. The cell phones provide registration information that includes device identification information and location information to the device registration module. The identifying information includes information such as phone number, MAC Id, IMEI number, IP address (IPV4, IPV6, or both) that can uniquely identify the cell phone. The location information indicates where the cell phone believes it is located. The registration information also includes information that can be used to communicate with the cell phone, in many cases this is also the identifying information. As the cell phone is moved it can automatically update the registration information. Note that registration can be automatic such that it occurs when the cell phone is turned on or when a compatible app is downloaded and installed because device registration need not require a person to enter information or approve the registration. The registration information can be stored in the database.

It is a further aspect of the embodiments that a message reception module accepts input messages from a publisher. The publisher can submit the input message through a cell phone or through another network connect device. The input message includes a payload and publication zone data indicating a publication zone. The publication zone is one or more geographic areas into which the message is to be published. A geographic area can be indicated by specifying its location and boundaries or by specifying an already defined area by name, label, tag, or Id.

It is a yet further aspect of the embodiments that a message targeting module determines which of the registered cell phones are recipient devices that will receive a published message. The published message can be the same as or derived from an input message. The recipient devices are inside the input message's indicated publication zone.

It is a still yet further aspect of the embodiments that a message publication module sends the published message. As such, the message recipients are people carrying, possessing or near registered cell phones inside the input message's publication zone. The message recipients can receive published messages that include the input message's payload.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION OF THE INVENTION

Figure 1:
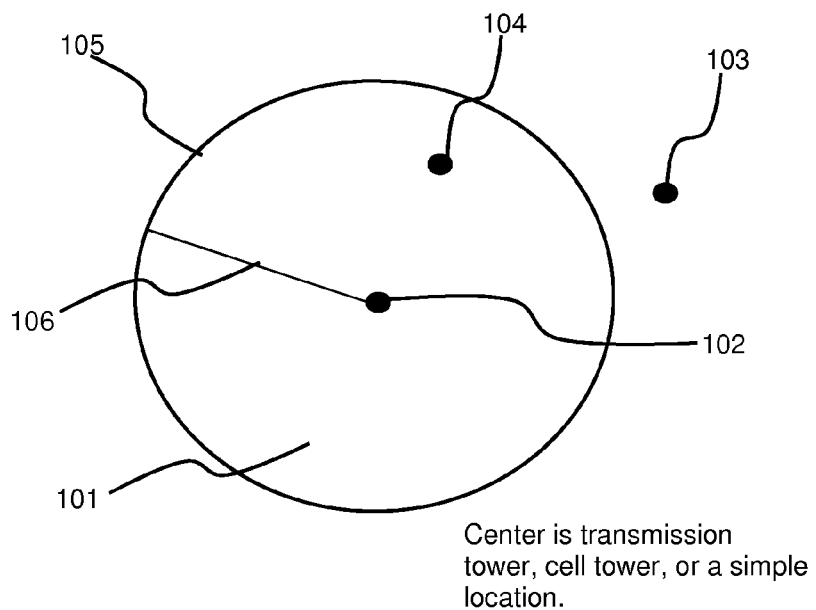
FIG. 1, labeled as 'prior art', illustrates proximity based interaction.

The particular values and configurations discussed in these non-limiting examples can be varied and are cited merely to illustrate embodiments and are not intended to limit the scope of the invention.

Text, voice, and video messaging techniques and social networks are enhanced with geolocation and permissions information. Basic messaging has a publisher publishing a message and subscribers receiving the message. Permissions can limit the publisher to publishing only into certain geographic zones. Recipients within a zone receive the message and other people or devices do not. Recipients can choose to subscribe to additional geographic zones to thereby receive messages directed into that zone. Publisher and subscriber zones do not need to cover the same geographic areas. Zones can be predefined or can be dynamically created, perhaps on a per message basis.

Geographic zones can be used for directing messages, for permitting people to send messages, and for allowing people to choose what messages they receive. Publishers can have permitted zones or permission zones into which they are allowed to send messages. For example, a school principal in Kansas should be permitted to send messages to everyone at the school but should not be permitted to send a message to every person in California. As such, the school principal can be granted a permission zone for publishing messages to everyone inside of the school zone. Subscription zones provide subscribers the ability to subscribe to messages from certain geographic zones or publishers. Returning to the example, children's parents can try subscribing to the school principal, to the school zone, or to a geographic zone intersecting (having some geographic overlap) the school zone. Publication zones are geographic zones into which messages are sent. The school principal can set a messages publication zone to the school zone and publish the message so that everyone inside the school zone as well as all the subscribing parents receive the message.

Permissions can limit where people can send messages, who can send the message to whom, and who can receive what message. In the school principal example, the school principal can publish messages to everybody at the school. The principal should not be able to grant himself permission to publish messages to everyone in additional zones. A publisher should have the ability to control who can subscribe directly to the publisher. Returning to the example, the principal can permit only friends and colleagues to subscribe directly to the principal himself. As such, parents attempting to subscribe to the principal can be refused, can be automatically subscribed to the school zone instead, or can receive a refusal containing an option to subscribe to the school zone. The principal can set up the refusal as a standard response to refused subscriptions. The messaging system can automatically generate the refusal. The messaging system can offer the parent a school zone subscription after discovering that a parent can't subscribe directly to the principal as desired but that the principal can publish to school zone and that the parent can subscribe to school zone. The messaging system can proactively check the case 'everyone' subscribing to 'principal' and automatically provide the principal with the option to approve the automatically generated refusal message.

Publishers and subscribers can create zones but can't obtain more permissions than they already have. A publisher can create an 'everyone everywhere' zone and send messages to it but everyone everywhere need not receive the publisher's messages. Only those people who would receive that publisher's messages somewhere would receive those 'everywhere' messages. On the other hand, someone who can publish to a group of people in a certain geographic zone can send messages to a subset of that group of people and into zones inside that certain geographic zone. Similarly, someone subscribing to 'everyone everywhere' will only receive messages they are permitted to receive because a publisher can limit a message's recipients to select people.

Messages can be sent to or published to groups. In the previous example 'everybody' is the group containing absolutely everybody and the ability to send to the 'everybody' group should be extremely limited and tightly controlled, perhaps by regional or national governments. On the other hand, a person can subscribe to everybody everywhere to receive more messages than he probably wants. A publishing group is an administrative convenience for handling publishers. For example, 'school principal' can actually be a publishing group containing the actual principal and a few trusted administrators. The group's membership can be updated as people change jobs, etc. In this manner, the group's permissions and other details can remain stable even as its membership changes. Subscription groups are similar. Parents can join and leave a 'parents' subscription group that subscribes to the school zone and to a 'parent teachers association' publishing group. Publishing groups and subscription groups can have group administrators, be open to all, be invitation only, be open with approval, etc.

Subscribers (including subscription groups) can grant permissions to publishers to create further subscriptions. For example, the school's teachers can join the 'teacher's' group that gives the principal the ability to subscribe them to publishing groups and geographic zones. The principal can then create 'english' and 'math' groups and subscribe the appropriate teachers to each group. For a school field trip to a museum, the principal can create a group, set the group's subscription zone to the geographic area containing the museum, assign teachers to the group, and grant at least one person the permission to publish to the zone. As the zone creator, the principal can publish into it and select or approve subscribers.

Figure 2:
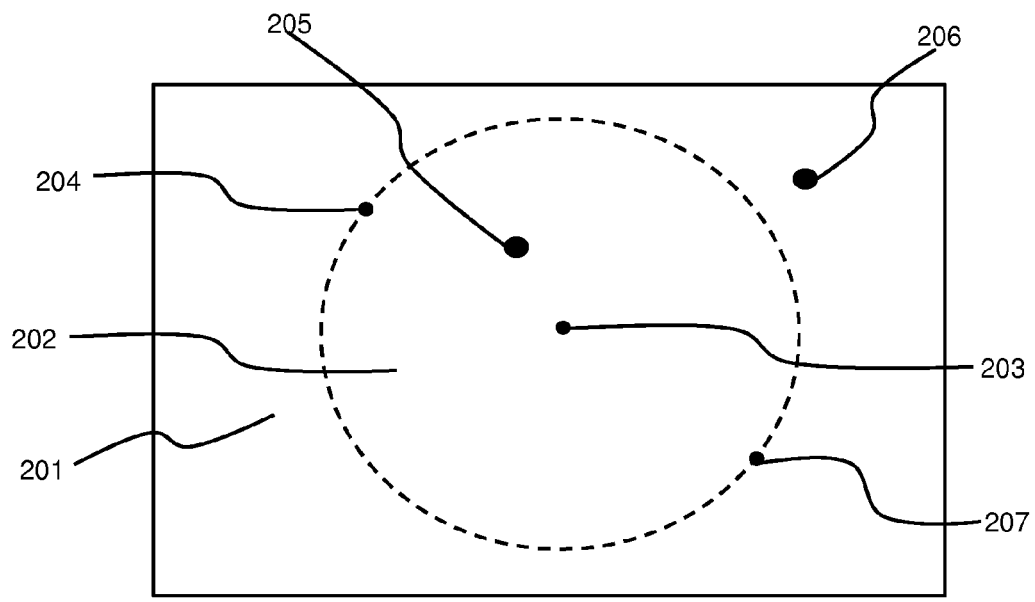
FIG. 2 illustrates a geographic zone specified by a locus and a radius in accordance with aspects of the embodiments.

FIG. 2 illustrates a geographic zone specified by a locus 203 and a radius in accordance with aspects of the embodiments. A circular geographic zone can be specified by a locus 203 and by a radial distance from that locus. The locus 203 itself can be specified by geographic coordinates such as those obtained from a global positioning system (GPS). In some cases, a person will use a landmark, road intersection, or other reference to indicate a locus. In such cases, the person's reference can be converted to a geographic coordinate. There are a wide variety of service's that can perform such a conversion and the better ones for the use with the present embodiments provide an internet accessible API (application program interface) for doing so.

FIG. 2 also illustrates a possible user interface for defining circular zones. A smart phone or other computer can display a map 201. A person can navigate around the map 201 by panning and zooming. Map navigation with mouse and keyboard is fairly well understood if not standardized. Similarly, combinations of finger drags and pinch-to-zoom gestures are well established for navigating maps on multi-touch enabled displays. A person can click and drag with a mouse to select the locus 203 and boundary 204 of a circular zone 202. Multitouch users can instead use a finger press and drag or can use two fingers to position opposing edges 204, 207 of the bounding circle. Once the zone is acceptable, the person can approve by pressing a button (generally a virtual on screen button) or by some other means. Person 205 is inside the zone 202 while person 206 is not.

A related zone is an ellipse zone. An ellipse is defined by two loci with the boundary being a cumulative distance from both loci. Two fingers on a multitouch display can create and change the loci positions and the boundary can be moved by dragging it closer to and further from the loci. An 'orbit' zone can be created by selecting the location of a gravity well, dialing gravitational force up and down, and dragging a point on the orbit around. The shapes of ellipses and orbits can be quickly calculated and displayed to provide a user with an interactive experience.

Figure 3:
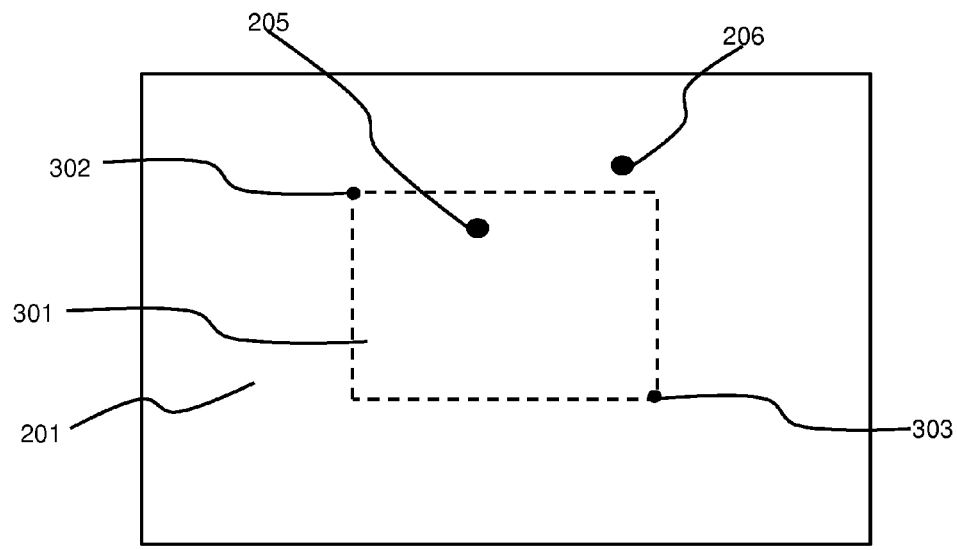
FIG. 3 illustrates a geographic zone specified by a bounding rectangle in accordance with aspects of the embodiments.

FIG. 3 illustrates a geographic zone specified by a bounding rectangle in accordance with aspects of the embodiments. The bounding rectangle of a rectangular zone 301 can be defined by two opposing corners or by four lines. In some cases, a rectangle can be drawn on a map 201 and the four sides independently selected and moved while another gesture can select the entire rectangle for rotation. Alternatively, opposing corners 302, 303 can be selected and moved. As with the circle, pinch-to-zoom type gestures are convenient when two finger tips correspond to opposing corners 302, 303.

Figure 4:
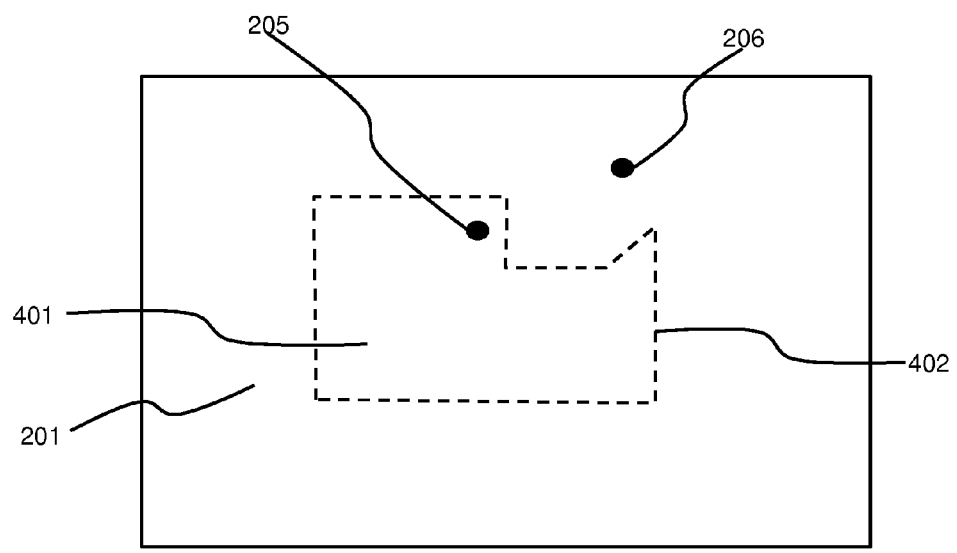
FIG. 4 illustrates a geographic zone specified by a bounding polyline in accordance with aspects of the embodiments.

FIG. 4 illustrates a geographic zone specified by a bounding polyline 402 in accordance with aspects of the embodiments. Polylines are generally defined as a series of vertices. In mapping, a geographic coordinate can specify each vertex. A polyline zone 401 must be closed so that it has an obvious interior and exterior. Polylines can be closed by connecting the last vertex to the first vertex. Polylines can be entered by selecting and adjusting the vertex positions. Vertices can be added to the polyline by selecting a line segment and pulling, choosing 'add vertex' from a menu or button, or in some other manner. Similar inputs and gestures can be used to delete a vertex.

Figure 5:
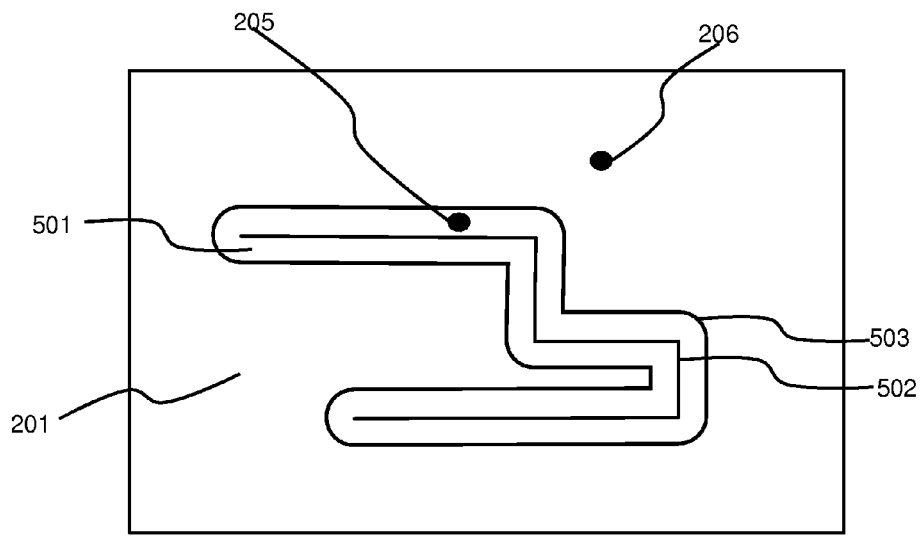
FIG. 5 illustrates a geographic zone specified by a polyline or route and a distance in accordance with aspects of the embodiments.

FIG. 5 illustrates a geographic zone specified by a polyline, route, or path and a distance in accordance with aspects of the embodiments. The path zone 501 is handy when a person wants to receive messages regarding a route. For example, the path can be the person's route to work and the person wants to know if there is a problem along the route. The path 502 can be selected on a map 201 by choosing a series of vertices, such as road intersections. The distance specifies how big the region is around the path and can be entered numerically or by choosing an edge 503 and moving it until the path zone 501 looks fine.

Figure 6:
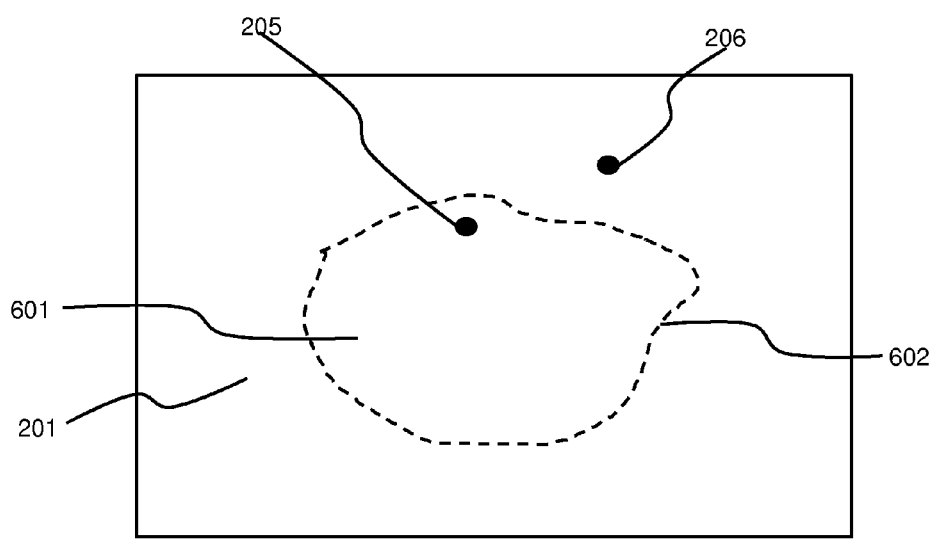
FIG. 6 illustrates a geographic zone specified by an arbitrary border in accordance with aspects of the embodiments.

FIG. 6 illustrates a geographic zone specified by an arbitrary border in accordance with aspects of the embodiments. This kind of zone, here called a 'blob zone' 601, can be specified by simply drawing a boundary 602 around an area on the map 201. On a multi-touch screen, a person can simply use a finger to trace it out. If the boundary is not closed then the start and end can be connected as with the bounding polygon and, similar to the bounding polygon, the boundary can be stored as a list of vertices defining a plethora of small line segments. The drawing of boundaries in this manner can lead to spurious line segments when a person draws a closed boundary and leaves some extra at the beginning and end of the scrawl. The spurious line segments should be automatically deleted because they do not go to defining the blob zone 601 in the interior of the drawing boundary 602.

Figures 7, 8:
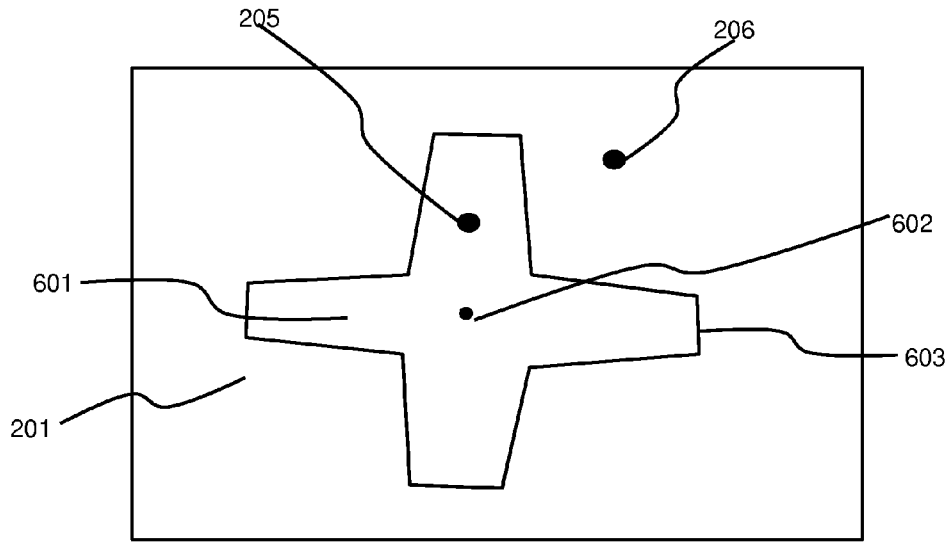
FIG. 7 illustrates a geographic zone specified by a locus and a time limit in accordance with aspects of the embodiments.
FIG. 8 illustrates generalized description of various zone types in accordance with aspects of the embodiments.

FIG. 7 illustrates a geographic zone specified by a locus 602 and a time limit in accordance with aspects of the embodiments. Here, a locus 602 is selected and the time zone 601 includes those geographic locations that can be reached from the locus 602 within a certain time. Mapping and route planning services often have time and distance matrices from which the time to travel between two places can be obtained. In one embodiment of the time zone, the message service can determine a bounding path 603 by repeatedly querying the route planning service. Various heuristics can reduce the number of queries. For example, a Newton-Raphson technique can quickly find points on the boundary 603 that can then be treated as a bounding polyline. In another embodiment, the messaging service can submit the location of each possible recipient to determine which ones are close enough. A heuristic to reduce the number of queries in this case would have close enough recipients as bounding polyline vertices so that anyone within the boundary is immediately known to be close enough. A further refinement is that the user's cell phone itself can submit the queries to the route mapping service and thereby determine the bounding polyline or the close enough recipients. This refinement keeps the messaging service from for sending a lot of queries to the route mapping service and thereby generating a large bill. Instead, the cell phone's owner can directly pay the route mapping service, perhaps via subscription. The cell phone's owner can also be provided with a choice of mapping services that the messaging app can access.

FIG. 8 illustrates generalized description of various zone types 701 in accordance with aspects of the embodiments. Each of the zones types has already been discussed except for the poly zone. The polyzone is simply a collection of other zones. For example, a poly zone can be two disjoint rectangular geographic regions, can be multiple geographic regions that partially overlap, etc. Locations can be specified as geographic coordinates. Note that the illustrated descriptions are intended only as non-limiting examples—as are all the examples and descriptions in this document. As illustrated, each of the zones has an area or geographic extent. An extentless zone is a zone having a locus or location only and can be specified by just a coordinate or a radius zero circleZone.

Figure 9:
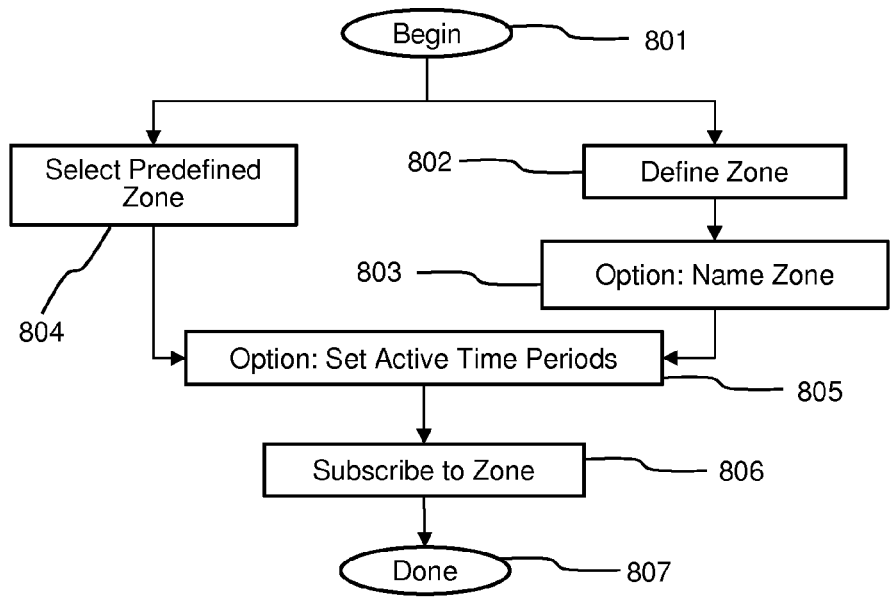
FIG. 9 illustrates a high level flow diagram of a subscriber subscribing to a zone in accordance with aspects of the embodiments.

FIG. 9 illustrates a high level flow diagram of a subscriber subscribing to a zone in accordance with aspects of the embodiments. People within an input message's publication zone can be recipients because they are inside the zone. People outside the zone can be recipients if they subscribe to the publication zone or to a zone intersecting (sometimes termed overlapping) the publication zone. The zone to which the subscriber subscribes is called a subscription zone because it is a zone from which the subscriber receives messages. In contrast, a publication zone is a zone into which the publisher sends a message.

After the start 801, the subscriber can choose a predefined zone 804 or can define a new one 802. The zone can be named 803 so that it is easier to refer to and as a step to making the zone definition available to other people. The subscriber can select a time period for which their subscription to the zone is active 805. For example, the zone might cover the subscriber's work commute. As such, the subscriber might want the zone active only for a few hours each work day. Finally, the subscriber submits the subscription 806 to the messaging service before the task is done 807.

Defining zones is discussed elsewhere in this document. A predefined zone is a geographic zone that some else has already defined and made the definition available. For example, Montana is a geographic zone definition that should be widely available. Predefined zones can be selected from a menu, displayed on a map for selection by pointing device or finger tap, or in some other manner. A zone selection menu can offer only those zones visible in the currently displayed map such that zooming in on the map reduces the number of menu selections. Offering only zones covering greater than a certain percentage of the map area can also keep the selection list more manageable. Zones can be color coded, perhaps with some transparency as is available with a graphics alpha channel, such that underlying zones aren't completely occluded. Overlying zones can be sent to the back so that underlying zones become selectable.

Figure 10:
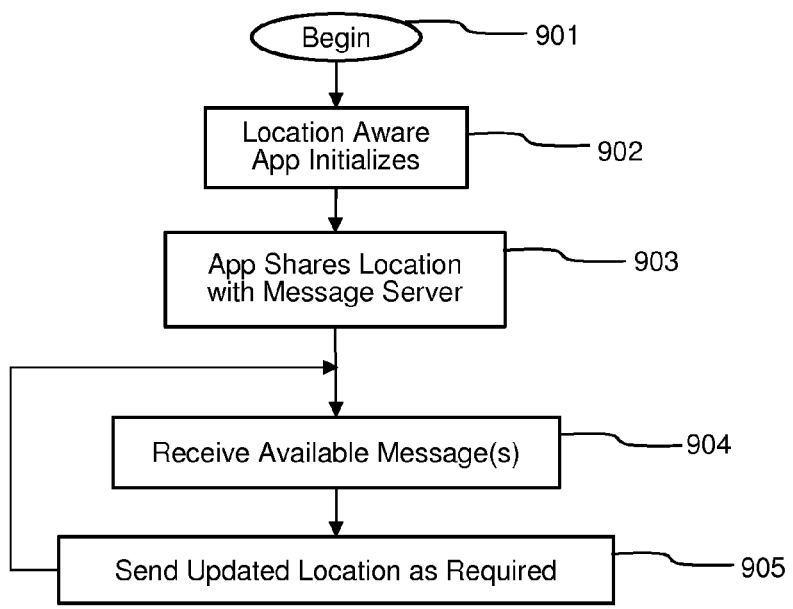
FIG. 10 illustrates a high level flow diagram of a cell phone registering its location with a messaging system in accordance with aspects of the embodiments.

FIG. 10 illustrates a high level flow diagram of a cell phone registering its location with a messaging system in accordance with aspects of the embodiments. The app can begin 901 for a number of reasons. Turning on the cell phone causes the cell phone's operating system to initialize and to automatically start various services and executable programs. The app can be one of those services or executable programs. The app can also begin as soon as it is downloaded and installed into the cell phone. The app can be started manually by the person using the cell phone. The app can also be automatically launched or awoke when an event or signal occurs. Examples of an event or signal include the "broadcast" in the Android OS and the "signal" in UNIX and its decedents.

The app can initialize 902 by setting up its internal data structures and discovering information about the cell phone that is running the app. That information can identify the device (cell phone), identify the device's owner, and determine the device's location. The location can be a coarse location or a fine location. Typically, GPS provides a fine location whereas Cell-ID and WiFi provide coarse location. Cell-ID is a location technique based on nearby cell towers while WiFi ID is a technique based on nearby WiFi access points having known locations. Many cell phone OSs provide fine and coarse location capabilities to apps. The location error can be included in the location information.

The app can use the cell phone's data connections to share identification and location information with a remote server 903. The remote server can store the information in a database. The app then waits for available messages 904 and sends location updates to the server as required 905. Notice that FIG. 10 indicates that the app is looping or polling. This need not be the case. Signals, events, or broadcasts can awake the app. A 'location update' service in the cell phone can track the cell phone's location and awaken the app (and any other interested app) based on location update rules such as the phone having moved greater than a certain distance such as 100 meters, or having moved 10 times the location accuracy, or a combination of rules. Similarly, the app can be awakened when a messaging event occurs. The Android OS currently offers a broadcast to awaken apps upon reception of an SMS message. A messaging app can be awoken by a service that awaits messages from the messaging system and also when the phone receives an SMS message.

Figure 11:
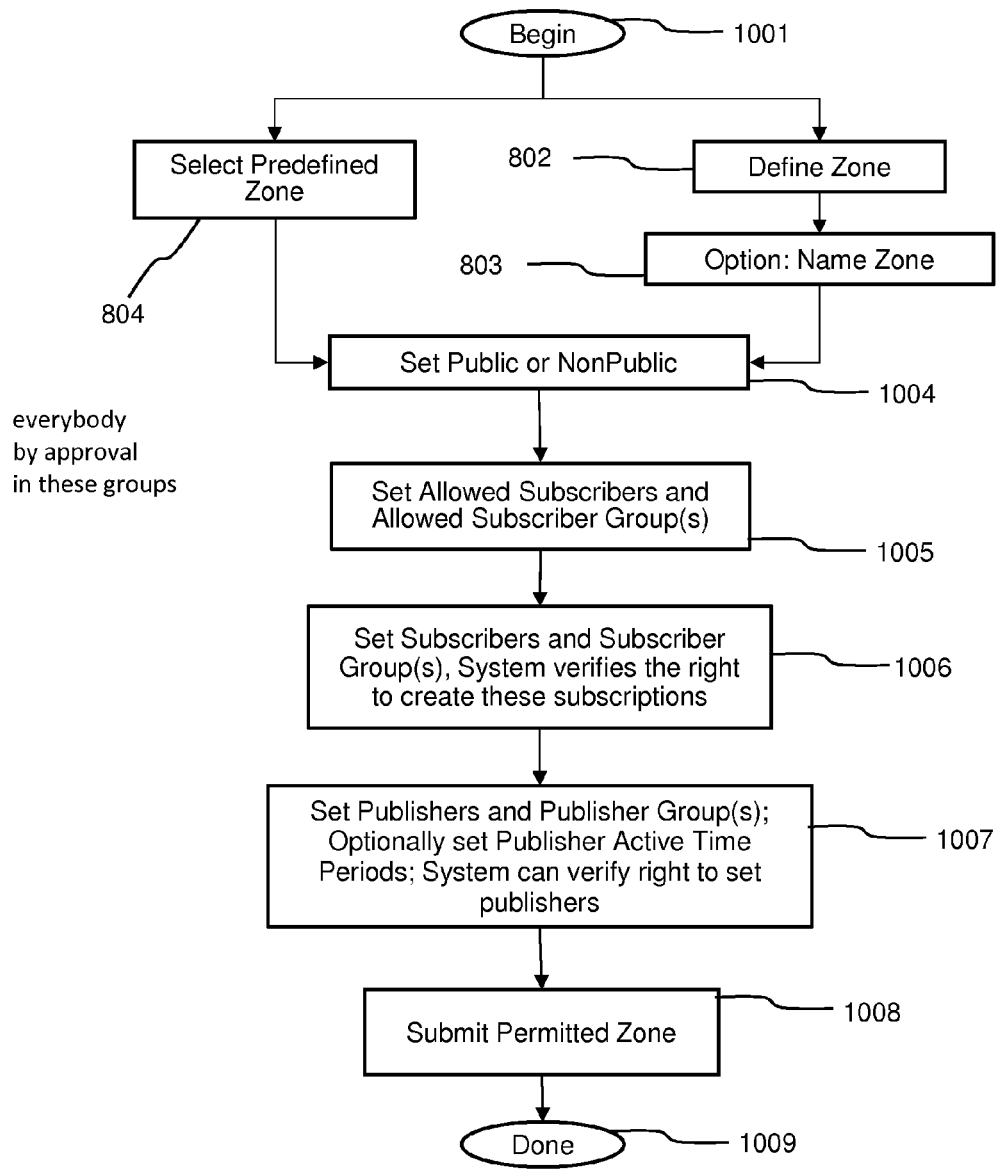
FIG. 11 illustrates a high level flow diagram of a publisher defining a publication zone in accordance with aspects of the embodiments.

FIG. 11 illustrates a high level flow diagram of a publisher defining a permitted zone in accordance with aspects of the embodiments. A permitted zone is a zone into which a person is allowed to send messages. After beginning 1001, a person can define 802, 803 or choose 804 a zone, set the zone Public if allowed 1004, and then set the allowed subscribers or subscriber groups 1006. The publisher can then select other publishers who are allowed to publish into the zone 1007, set publication times, and then submit the permitted zone to the messaging system 1009.

One example of setting a permitted zone is that an earth_Admin has permission to publish to everyone, everywhere, at any time (other options include SolSystem_admin and MilkyWay_Admin). The earth_Admin can create a US zone that contains all the United States, set it public, allow anyone to subscribe, and permit US_Admin to publish into and administer the US zone. US_Admin can be a single person or can be a group of people. Each person can have their own registered identity within the messaging system. US_Admin can create multiple other zones such as US_gov (non-public, government subscribers only) and public zones for each state. A public permitted zone is a zone in which everyone receives messages. A message sent to everyone in the US zone should be received by every messaging system app in the US. As such, the ability to publish into public zones should be severely restricted. US_Admin does not have permission to publish messages to everyone on earth or to create public zones outside the US—unless given those permissions by earth_Admin. Earth_admin can grant those permissions by editing the 'earth' zone. Also note that US_Admin can publish a message to everyone in Iowa by selecting Iowa (either predefined or perhaps by using a map interface to select an area including Iowa) and sending a message there.

Another example is that an individual, herein called myOwnSelf, can create a permitted zone called myUS that contains all the United States. The individual can not make the myUS zone public unless the individual already has the required permissions. The individual can limit the subscribers to a group of his friends and can give a few select friends the right to publish into the myUS zone and possibly even the rights to add more publishers, define permitted zones within myUS, etc.

Figure 12:
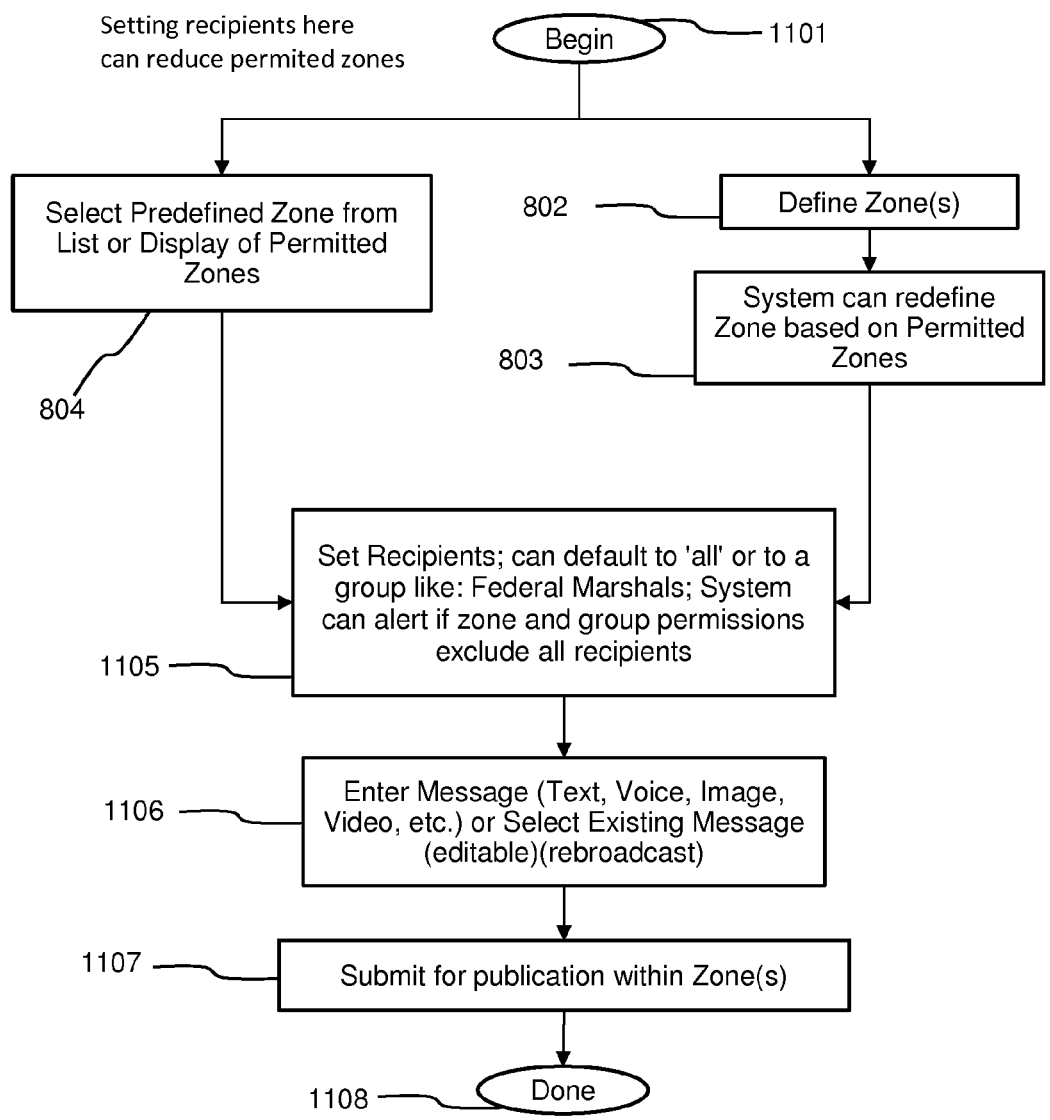
FIG. 12 illustrates a high level flow diagram of a publisher submitting an input message to a messaging system in accordance with aspects of the embodiments.

FIG. 12 illustrates a high level flow diagram of a publisher submitting an input message to a messaging system in accordance with aspects of the embodiments. After beginning 1101, a person can define 802, 803 or choose 804 a zone and then choose the intended recipients for the message 1105. Recalling the examples above a US_Admin can select 'all' in which case everyone is a recipient. In contrast, the individual 'myOwnSelf' can select 'all' in which case every subscriber to myUS can be a recipient. Note that a subscriber can subscribe to myUS with the further rule or specification to receive myUS messages only when located within myUS. A different rule or specification is to receive myUS messages always or only within certain time periods. A subscriber can also subscribe to a particular publisher or publication group. Additionally, as is typical of email systems, a subscriber can blacklist individuals or groups, and can filter messages for special treatment.

The publisher can enter message 1106 and submit it to the messaging system 1107 before being done 1108. The publisher can enter a message 1106 by entering a new message or editing an existing one. The publisher can rebroadcast an existing message to a different group of subscribers.

Figure 13:
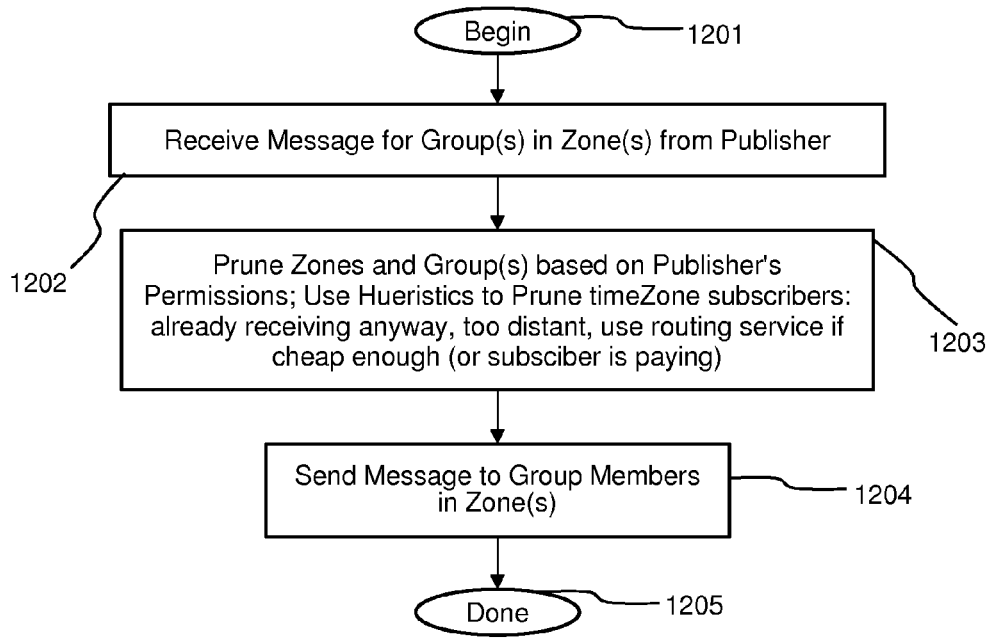
FIG. 13 illustrates a high level flow diagram of a messaging system processing an input message in accordance with aspects of the embodiments.

FIG. 13 illustrates a high level flow diagram of a messaging system processing an input message in accordance with aspects of the embodiments. After beginning 1201, the messaging system can wait until it receives an input message 1202. The input message is from a known publisher and targeted at certain groups within certain publication zones. The system prunes the zones and groups based on the publisher's permissions. For example, myOwnSelf can publish a message to everyone everywhere. The messaging system can automatically prune that set of recipients down to those subscribing to myUS because those are the only ones myOwnSelf is allowed to publish to. The messaging system can then send a published message to the recipients. The published message can be the same as the input message or can be derived from it. For example, the published message can contain only the input message's payload or can include sufficient publisher and zone information that the recipient app can filter the message. The published message can be customized for each particular recipient and can include only the zone information relevant to that recipient. For example, a message can be published into two publication zones with the subscriber subscribing only within one of those zones. The published message for that one subscriber can contain information about only that one zone.

Another pruning operation is the attempt to avoid sending the same message to the same person multiple times. One particular case in which this can happen is when people rebroadcast messages without editing. The system can retain a list of messages sent to each recipient and use it to avoid duplication. The list need not contain copies of actual messages sent but can contain message IDs or the digital signatures of the sent messages.

Figure 14:
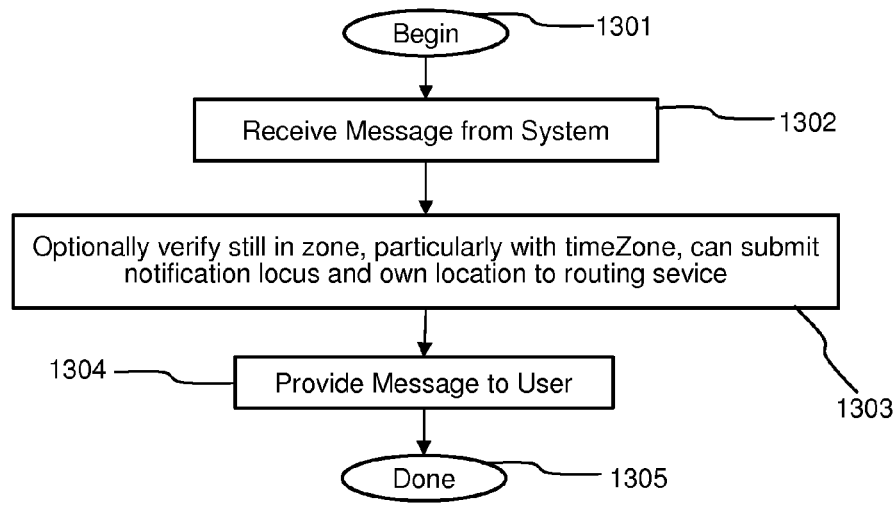
FIG. 14 illustrates a high level flow diagram of a cell phone processing a published message in accordance with aspects of the embodiments.

FIG. 14 illustrates a high level flow diagram of a cell phone processing a published message in accordance with aspects of the embodiments. After beginning 1301, a recipient (a messaging app running on a cell phone) receives a published message from the messaging system 1302. The cell phone can immediately provide the message to the user 1304 before it is done with that message 1305. Optionally, the cell phone can verify that it is a valid recipient 1303 and that it should pass the message to the person 1304. The cell phone can discard or disregard a published message if the published message specifies its publication zones and if the cell phone is not in any of those zones.

Figure 15:
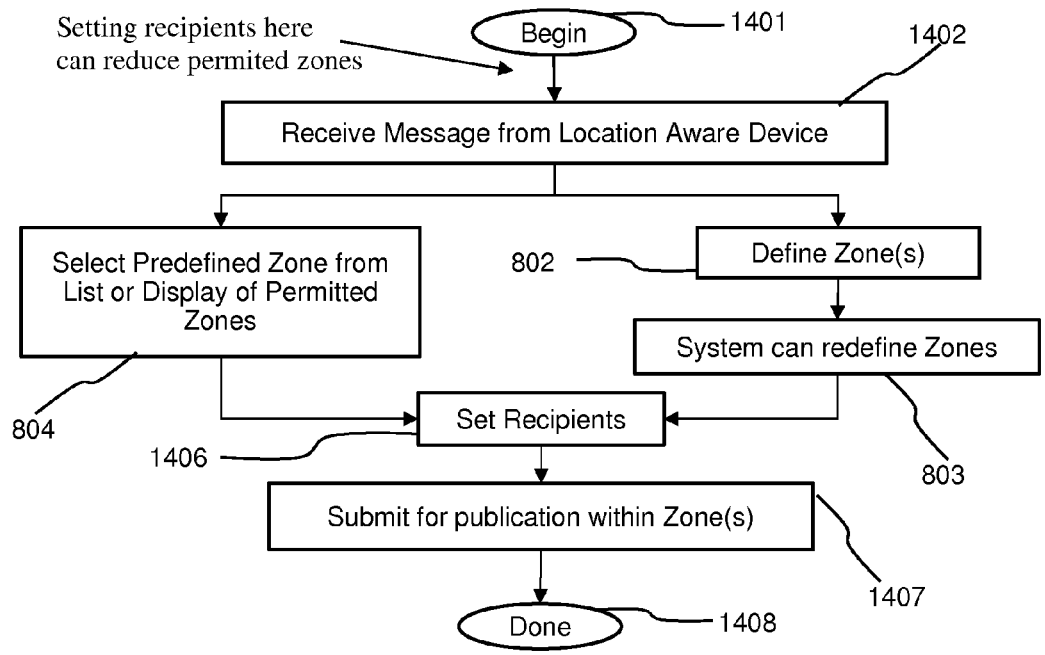
FIG. 15 illustrates a high level flow diagram of a cell phone relaying an input message in accordance with aspects of the embodiments.

FIG. 15 illustrates a high level flow diagram of a cell phone relaying or rebroadcasting a message in accordance with aspects of the embodiments. After beginning 1001, a person receives a published message from the cell phone 1402. The person decides to rebroadcast the message to other people by defining 802, 803 or choosing 804 a zone, selecting the recipients (optional—zone selection can implicitly choose recipients) 1406, and sending the message back to the messaging system 1407 as an input message.

Figure 16:
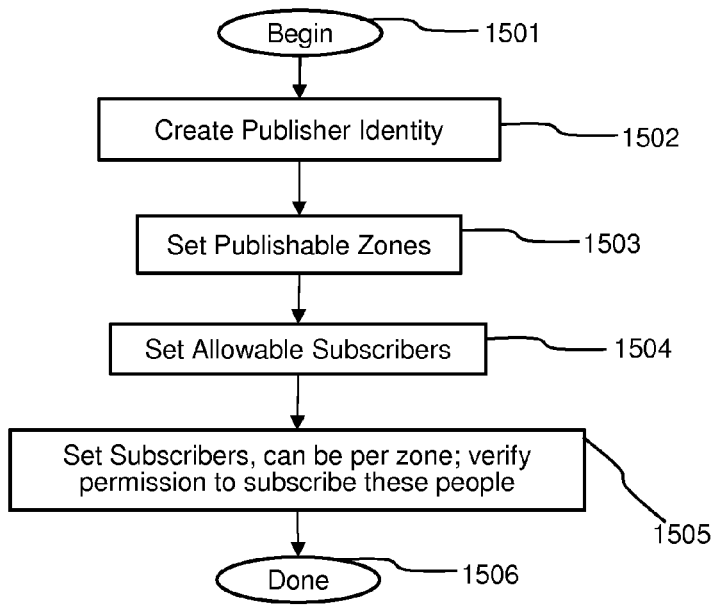
FIG. 16 illustrates a high level flow diagram of registering a publisher with a messaging system in accordance with aspects of the embodiments.

FIG. 16 illustrates a high level flow diagram of registering a publisher with a messaging system in accordance with aspects of the embodiments. After beginning 1501, a person can choose an identity 1502 (eg. myOwnSelf), set publishable zones 1503 (eg. myUS), and set allowable subscribers 1504 (eg. myFriends). An attempt can be made to set certain people or groups (eg. myBestFriends) as subscribers but the messaging system should verify that those people are willing. One way of verification is to allow people to opt-in or decline the subscription. Another option is that people can explicitly or implicitly grant permission. myBestFriends, of which myOwnSelf is a member, may have elected to allow each other to enter subscriptions. An employer may have the right to subscribe employees. A subscriber to myUS may be implicitly agreeing to subscribe to myKansas which is a zone created inside of myUS.

Figure 17:
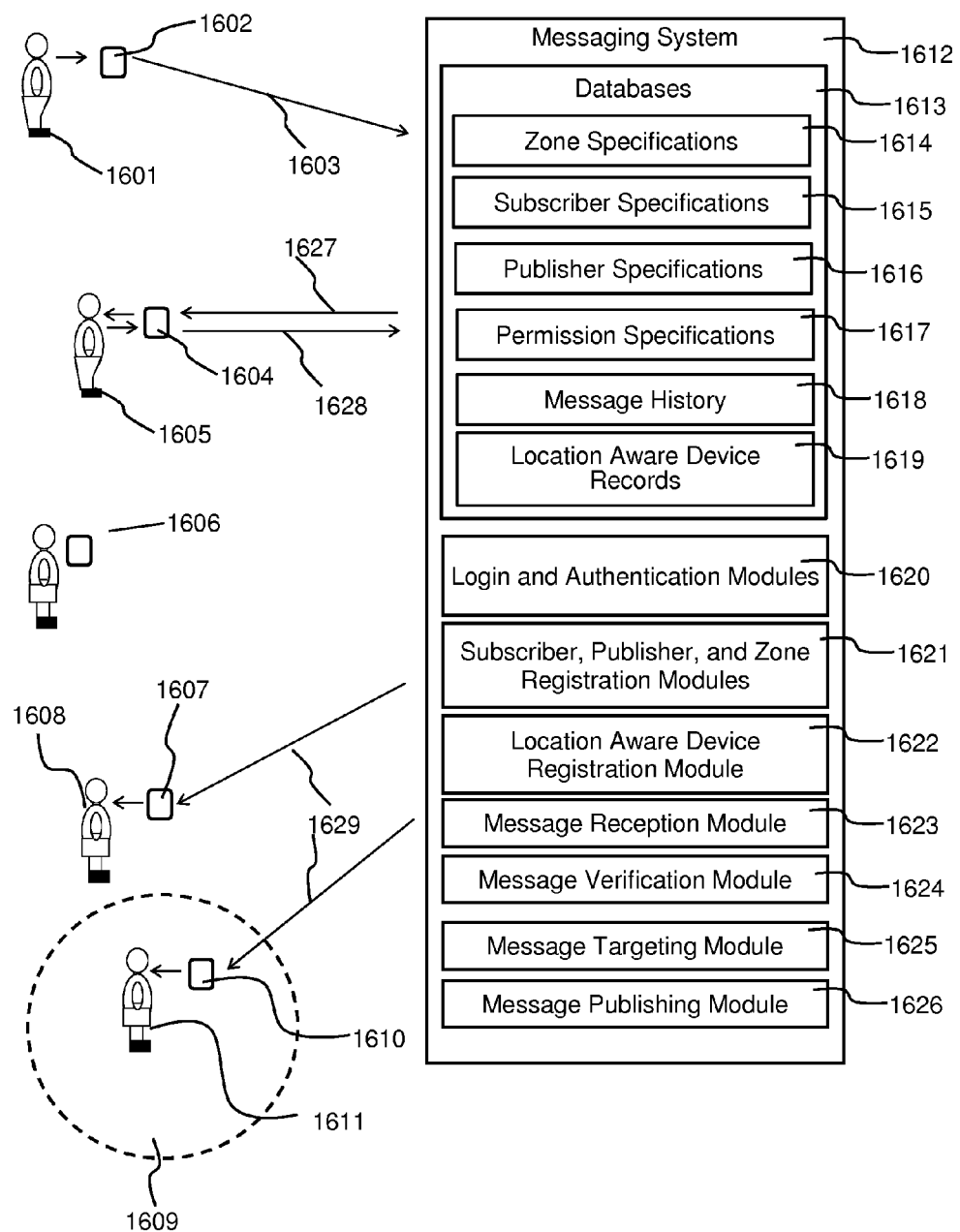
FIG. 17 illustrates a high level diagram of people interacting with a messaging system and therefor with each other in accordance with aspects of the embodiments.

FIG. 17 illustrates a high level diagram of people interacting with a messaging system and therefore with each other in accordance with aspects of the embodiments. A first publisher 1601 uses a messaging app installed in his cell phone 1602 to send an input message 1603 into a messaging system 1612. The messaging system 1612 has login and authentication modules 1620 that interact with the messaging app, and therefore the publisher 1601, to authorize the publisher 1601. The publisher wants to publish the input message 1603 to second publisher 1605.

A message reception module 1623 receives the input message 1603. A message verification module 1624 ensures that the publisher 1601 is permitted to publish to second publisher 1605. Note that the publishers' cell phones 1602, 1604 can use any of a variety of methods to ensure that the people using cell phones 1602, 1604 actually are first publisher 1601 and second publisher 1605. Those methods include biometric identification such as fingerprint, facial, or voice recognition, can include challenge/response questioning, or can require a password.

A message history 1618 can store a copy of the input message 1603. A message targeting module 1625 can identify second publisher's cell phone from subscriber specifications 1615 and/or location aware device records 1619. A message publishing module 1626 then sends first published message 1627 to second publisher's cell phone 1604 for delivery to second publisher 1605.

Second publisher 1605 decides to rebroadcast the message into zone 1609 and uses cell phone 1604 to send second input message 1628 to the messaging system 1612. Second input message carries the same payload as input message 1603 and first published message 1627 but has different publishing zone information and a different publisher. Second publisher 1605 may have edited the payload. Note that this can be considered an example of escalation wherein person 1601 does not have permission to publish into zone 1609 so person 1601 sent the message to person 1605 who does have the required permission.

The message reception module 1623 receives the second input message 1628. Message verification module 1624 uses the publisher specifications 1615 to ensure that the second publisher 1605 is permitted to publish into the zone 1609 and message history 1618 can store a copy of the second input message 1603. Message targeting module 1625 selects the recipients for the second published message 1629 by examining location aware device records 1619 and zone specifications 1614 to identify recipients within the zone 1609 and can examine subscriber specifications 1615 to identify recipients subscribing to the zone 1609 or directly to second publisher 1605. The message targeting module 1625 can also ensure that individual recipients receive the message only once. With the recipients identified, the message publishing module 1626 sends the second published message 1629 to the recipients.

Cell phone 1607 receives the second published message 1629 for delivery to subscriber 1608 because cell phone 1607 is registered with the messaging system 1612 and because subscriber 1608 has subscribed to zone 1609. Cell phone 1610 receives the second published message 1629 for person 1611 because it is registered with the messaging system 1612 and is inside the publication zone 1609.

Cell phone 1606 does not receive the second published message 1629 for a number of possible reasons. Cell phone 1606 may not have contacted the messaging system 1612 as required for the location aware device registration module 1622 accessed the databases 1613 to place cell phone 1606 in the location aware device records 1619. Cell phone 1606 is outside the publication zone 1609. Also, the person possessing cell phone 1606 may not be subscribed to zone 1609.

The zone specifications 1614 can be recorded in the messaging system's 1612 databases 1613 by the one of the modules for subscriber, publisher, and zone registration 1621. These modules 1621 typically interact with users to get the information to be stored in the databases 1613. This is in contrast to location aware device registration module 1622 that interacts with devices, not users, to get the information to be stored in the databases 1613.

Figure 18:
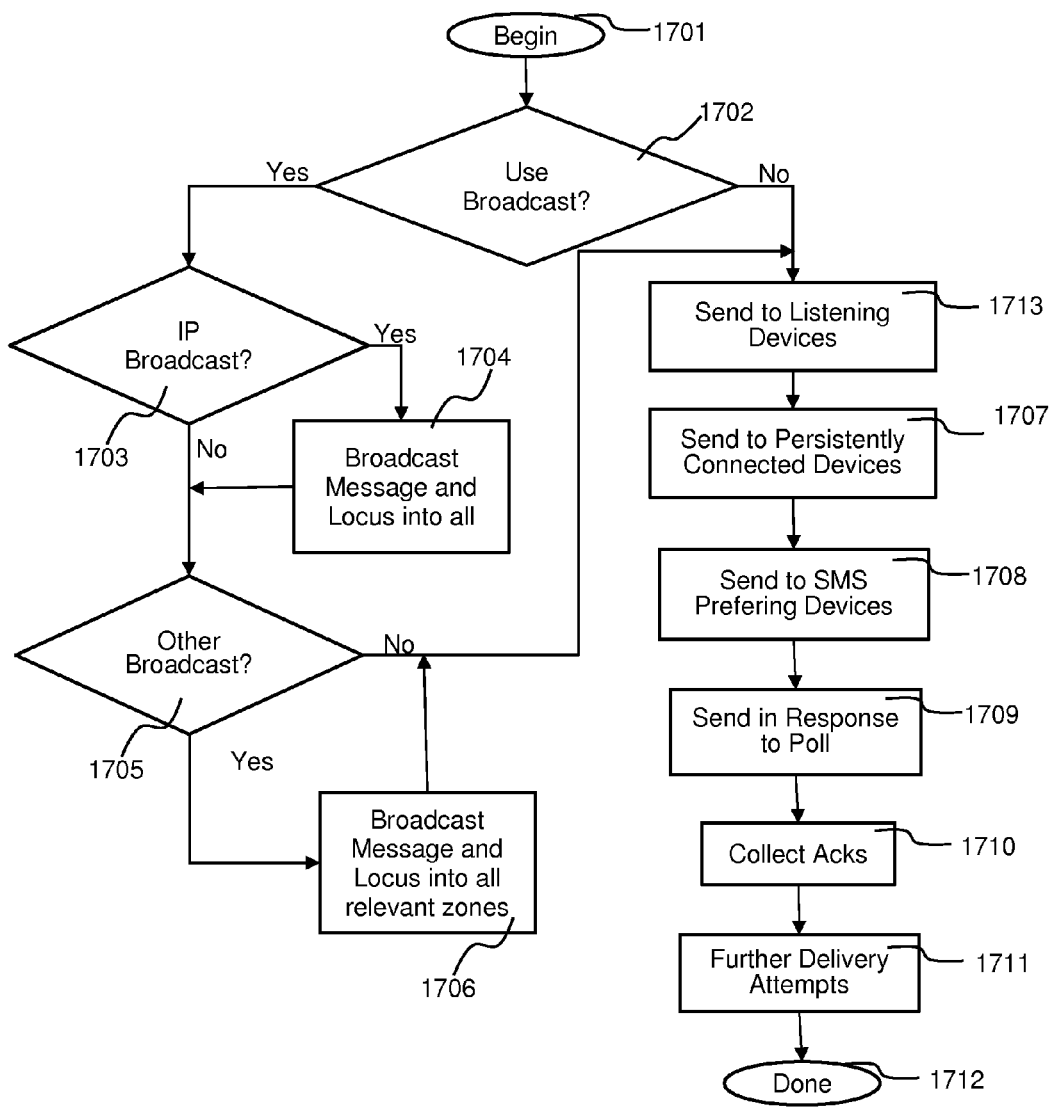
FIG. 18 illustrates a high level flow diagram of multicast or broadcast messaging in accordance with aspects of the embodiments.

FIG. 18 illustrates a high level flow diagram of multicast or broadcast messaging in accordance with aspects of the embodiments. After the beginning 1701 the option to broadcast is evaluated 1702. If broadcasting is not an option then the message is sent to listening devices 1713, to persistently connected device 1707, to SMS preferring devices 1708, and to polling devices 1709. An example of a listening device is a cell phone awaiting a TCP/IP (transmission control protocol/internet protocol) or UDP (user datagram protocol) message on a particular IP port. A persistently connected device is a device keeping an open connection to the messaging system. For example, a device using TCP/IP can open a connection, often called a socket, which stays connected until intentionally closed. Polling is a technique wherein a device periodically makes contact to see if a message is available. Devices can acknowledge receipt of the message 1710 and the messaging system may make further message delivery attempts 1711 to devices that have not acknowledged receipt. The further delivery attempts can be made using different techniques. For example, an attempt to directly connect via TCP/IP can be made when a broadcast enabled device hasn't acknowledged a message. The messaging system can even degrade to the point of trying SMS (perhaps with a command to connect via the internet). An even further degradation is that the messaging service can attempt dialing the recipient device if the device provides telephone services to its user and an audio message presented.

If broadcasting is an option then various broadcasting techniques can be employed. IPV4, the legacy internet protocol, and IPV6, which is an update of IPV4 support broadcast and multicast operations for sending data to a group of interested receivers. They are generally intended for reducing the burden on servers and the internet's transmission infrastructure when the same content is to be sent to many destinations. An example of this would be streaming video to thousands of households. Without multicast, a video stream is sent to each of those households. With multicast it is possible for a server to send out a single video stream that is received by all the households. Many cell phones support internet protocol through both WiFi and through their cellular network connections (edge, 2G, 3G, 4G, LTE, WiMax etc.). Other broadcasting techniques are also possible such as the cell phone receiving on a radio frequency dedicated to the broadcast distribution of messages. Any message, including a broadcast message, can contain a request, data, or flag indicating the cell phone should acknowledge receipt of the message. The acknowledgement request can contain data indicating where the acknowledgement is to be sent.

Having determined that broadcasting can be used, the messaging system then determines if IP broadcast or multicast can be used 1703 and if so send the message using IPV6 and/or IPV4 1704, whichever is appropriate. If other broadcast techniques can be used 1705 the messaging system can use those techniques 1706. The process can then proceed through sending messages to non-broadcast enabled devices.

Figure 19:
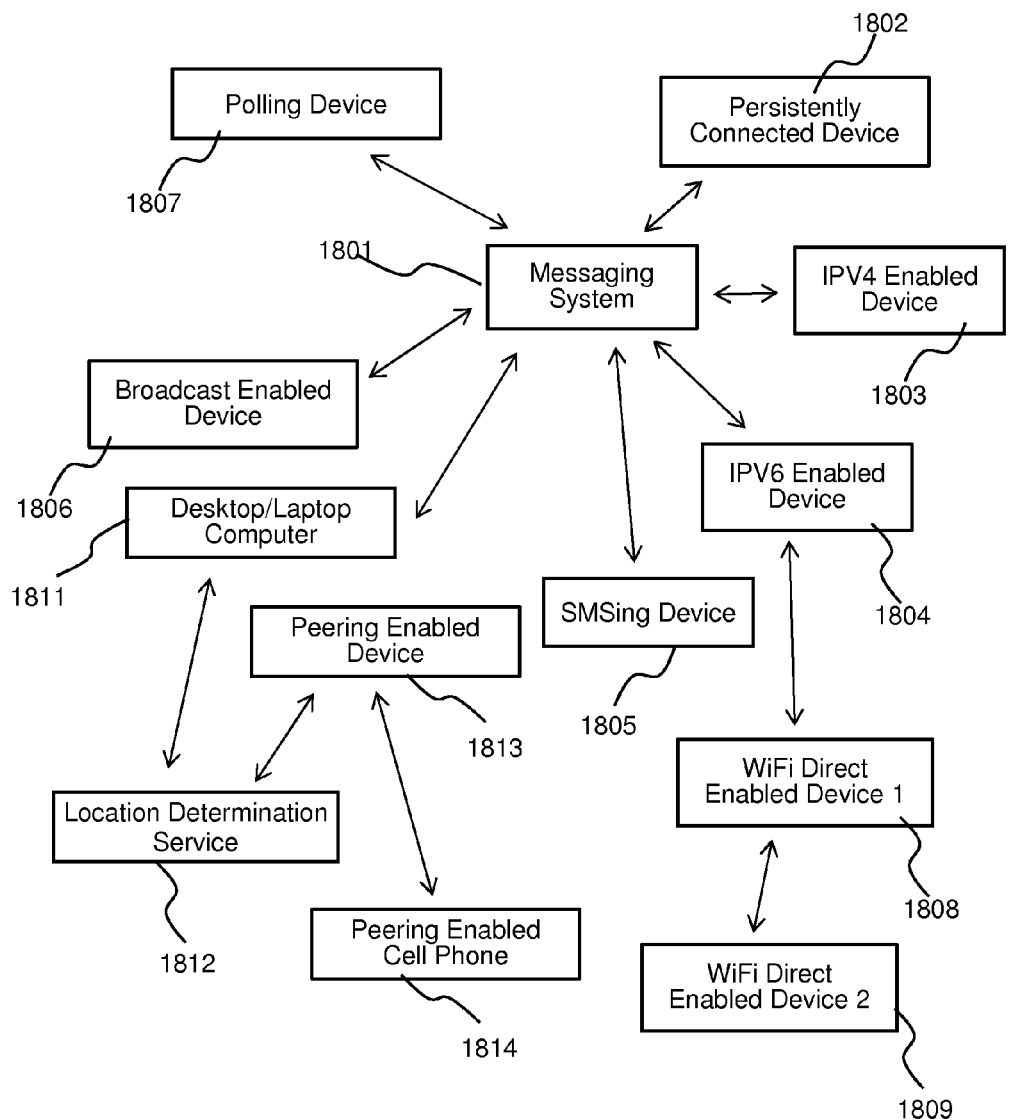
FIG. 19 illustrates various messaging devices and messaging modes compatible with a messaging system and in accordance with aspects of the embodiments.

FIG. 19 illustrates various messaging devices and messaging modes compatible with a messaging system 1801 and in accordance with aspects of the embodiments. Note that the illustrated blocks are not mutually exclusive because many devices can be classified into many of the illustrated blocks. The compatible messaging devices mentioned earlier in this document include polling devices 1807, persistently connected devices 1802, IPV4 enabled devices 1803, IPV6 enabled devices 1804, SMS capable devices 1805, and broadcast enabled devices 1806.

WiFi Direct is a technology that allows WiFi devices to communicate with each other without requiring wireless access points or similar devices. As such, a WiFi Direct enabled device can act as a wireless router and relay a message to another WiFi Direct enabled device. This capability can be important when a cell phone can not access the messaging service directly. It can instead attempt to contact the various WiFi access points, WiFi routers, and WiFi Direct enabled devices within range and ask them if they can or will relay messages. In some scenarios, such as with emergency notification or alerts, relaying can be allowed whereas it is not allowed or is limited for more casual situations. In this manner a single access point can provide a limited messaging service to everyone while providing greater service to preferred devices such as those authenticating with the access point. Here 'access point' includes WiFi Direct enabled device. Furthermore, mesh routing algorithms, ad hoc routing algorithms, and the routing algorithms employed in cellular telephony can be advantageously employed to ensure that messages and acknowledgments are delivered in dynamic scenarios with devices moving around, disappearing, and appearing.

Bluetooth, Zigbee, z-wave, and NFC (the near field communications technology and protocols currently being developed and deployed) also provide for communications between cell phones and other devices. Interestingly, these technologies and related technologies can be advantageously used with automated message publishers.

An automated message publisher is a device that monitors one or more sensors and detects interesting events. An interesting event can be as mundane as a refrigerator opening, a door opening, or a button being pressed on a remote control. An interesting event can be extraordinary such as a fire alarm, CO (or other gas) detection. The automated publisher can be configured with rules on when these events are interesting and should be published. The rules can have active/inactive time periods and can include thresholds or ranges for helping determine normal versus abnormal. The rules can be combined with 'and', 'or', 'nor', 'not' and 'xor' logical operators. For example, an interesting rule could be the front door not opening between 3 PM and 3:15 PM to indicate a child not coming straight home from school. The automated publisher can automatically report such an interesting event to a very limited group of subscribers. Note that the logical, or inclusive 'or' is the intent of the word used throughout this document.

Other devices that can be monitored include HDP (health device profile) compliant Bluetooth devices and similar devices. For example, a medical alert service can provide automated publishers (perhaps as cell phone apps) that listen to users' health monitoring devices (pulse, respiration, blood sugar, biomarker sensor, etc.) and publish health status reports. The medical alert service itself can alert on any message from any user. A hospital, on the other hand, can register its own facilities and parking areas (geographic zones) and listen for medical emergencies automatically published there.

FIG. 19 also shows a desktop or laptop computer 1811 interacting with the messaging system. Computer 1811 can run a program or access a web page for publishing messages into geographic zones and for performing many of the other functions that can be performed by publishers, subscribers, and messaging system administrators. Most desktop or laptop computers do not contain GPS chips or similar hardware. They can, however, determine their own location by using a number of known techniques. Most of the techniques involve sending data to a location determination service 1812. That data can contain an IP address, a MAC address, or information about the person owning or using the computer. The personal information can contain subscription information or credit card information. The personal information can be looked up in a database that links the person to an address. Similarly, a physical address can sometimes be determined from an IP address or MAC address. Some location finding techniques use IP address ranges and the addresses of routers or switches through which the computer 1811 accesses internet resources. Internet aware device such as televisions, media players, and home appliances can similarly be located and receive messages directed into zones. Furthermore, any internet aware and connected device can run an automated publisher that is installed on the device or is downloaded and run in a virtual machine such as a java or javascript interpreter including those run within web browsers.

Figure 20:
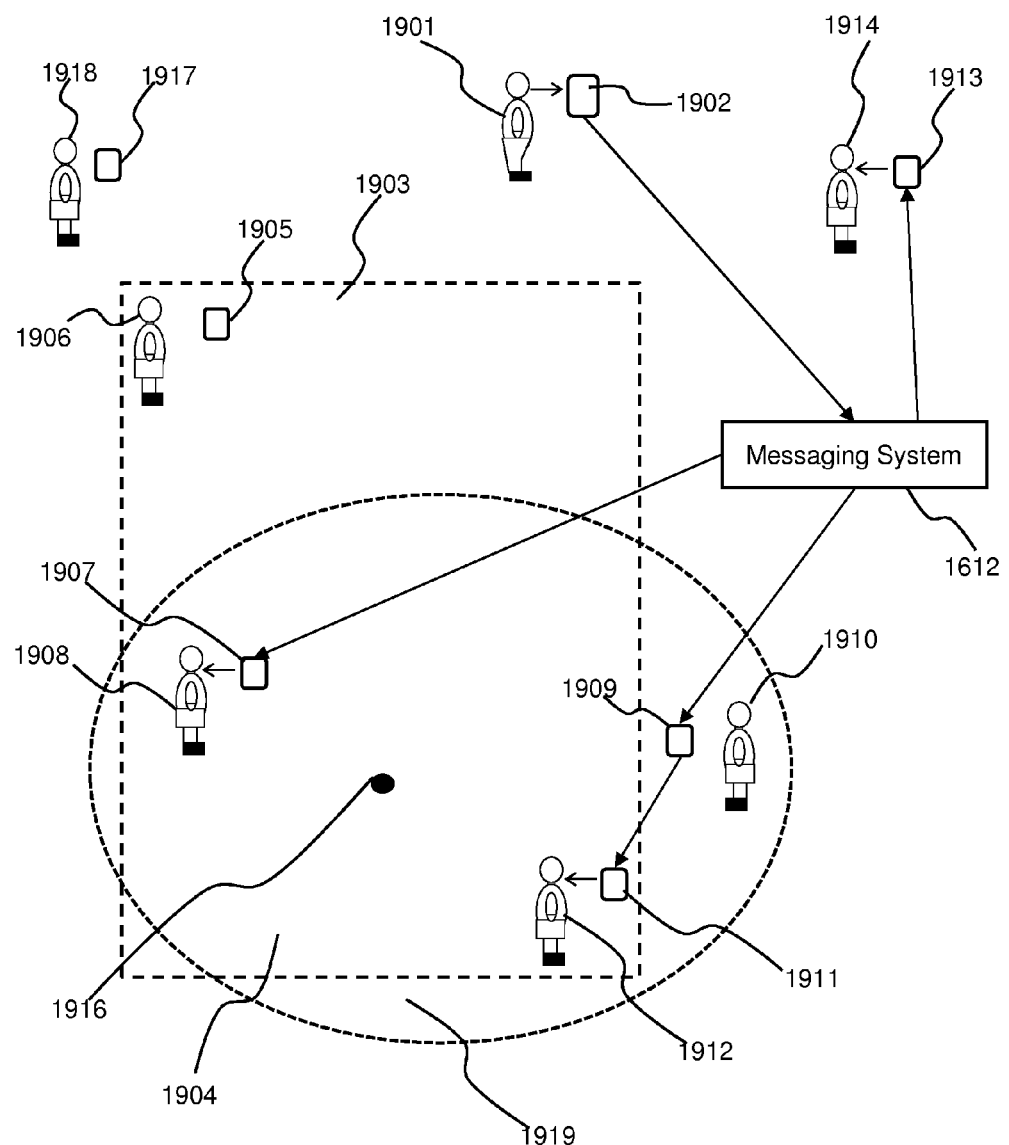
FIG. 20 illustrates a high level diagram of publishers, subscribers and zones in accordance with aspects of the embodiments.

FIG. 20 illustrates a high level diagram of publishers, subscribers and zones in accordance with aspects of the embodiments. Publisher 1901 uses a cell phone to publish a message into rectangular zone 1903. Publisher, however, only has permission to publish into circular zone 1904. Therefore, the messaging system prunes the zone down to that area where rectangular zone 1903 and circular zone 1904 intersect. Device 1917 is outside of both zones and does not receive the message nor pass it to user 1918. Device 1905 is inside publisher's 1901 permitted zone 1903, but is outside the circular zone 1904 into which the message is being published. Neither device 1905 nor user 1906 receive the message. User 1914 subscribes the circular zone 1904 and receives the message because circular zone 1904 and publisher's permitted zone 1903 do intersect. Registered device 1907 is inside the circular zone 1904 and the permitted zone 1903 and therefore receives the message and passes it to user 1908.

Cell phone 1911 is inside the circular zone 1904 and the permitted zone 1903 and should receive the message and pass it to user 1908. Cell phone 1911, however cannot connect to the messaging system 1612. Luckily, cell phones 1909 and 1911 both have WiFi Direct (or a similar capability) and cell phone 1909 allows cell phone 1911 to connect. As such, cell phone 1911 connects to and registers with the messaging system by way of cell phone 1909. Cell phone 1911 receives the message and passes it to user 1912. Cell phone 1909 is outside the permitted zone and normally wouldn't receive the message. Cell phone 1909 receives the message only because the message is routed through to cell phone 1911. Therefore, cell phone 1909 receives the message but does not present it to user 1910.

Cell phones and related devices can form peer-to-peer messaging networks. In essence, the WiFi direct example presented above is an example of peer-to-peer networking. There are numerous peer-to-peer networks but current implementations do not peer via direct communications links but instead through their broadband network providers. Cell phones can use methods and algorithms similar to present schemes but must make allowance for the fact that they continuously gain and loose peers as people move into and out of range. The aforementioned mesh routing algorithms, ad hoc routing algorithms, and routing algorithms employed in cellular telephony also provide solutions to this peering situation. A messaging system can take advantage of cell phone peer-to-peer networks by transmitting messages into a geographic zone and allowing the peering modules in the cell phones to further distribute the message to other nearby devices. The peering modules in the cell phones should track what messages they have sent so that they only send each message once to each peer. Messages should have timeouts or maximum hop-counts so that devices can discard messages that have been bouncing around too long. Devices connected to the messaging system only via a peer can increase the timeout or maximum hop-counts (or alter actual hop-counting) because the device is clearly within an area having poor communications infrastructure. Additionally, a device that is farther than some threshold distance from a message's publication zone can simply discard the message.

Peering modules can share location information so as to better route messages. The messaging system can send messages to peering enabled devices outside but near the publication zone for transmission into the zone. The devices outside the zone can forward the message to devices either in the publication zone or nearer to the publication zone. Of note is that a cell phone can route a message without presenting the message to person.

As with multicast, messages delivered via peer-to-peer can request acknowledgement of receipt. The acknowledgement should contain device identifying information saying which device is acknowledging. The acknowledged message can have a message Id, public key, digital signature, or snippet of executable code for identifying the message. The messaging system can preferentially process acknowledgements to thereby avoid sending the message to a device that has already received it from a peer or by other means.

Devices other than cell phones can contain peering modules. Returning to FIG. 19, peering enabled device 1813 can obtain its location via user configuration (a person enters the info directly into the device) or from the location determination service 1812. The peering enabled device can pass messages to peering enabled cell phone 1814. The peering enabled device can be any network connected (wired or wirelessly) device. For example, a wireless router can act as a peering enabled device. A person can obtain a wireless router for use with his home broadband connection. The wireless router happens to be running a linux or unix derived operating system, perhaps even the Android OS. The user, being a good Samaritan, connects to the router and navigates the router's user interface (probably web pages or app) to access an app marketplace or app store. The user instructs the router to download and install a messaging system app to thereby become a peering enabled device. Note that any network connected device having WiFi or wireless communications ability can similarly become a peering enabled device. Recent model televisions, consumer electronics devices, and home appliances can connect wirelessly with cell phones and can also connect to broadband networks. As such, these device can also become peering enabled by installing the right app or by configuring and enabling a pre-installed peering module.

Also of note is that any device using short range communications to contact a location aware device can thereby obtain a good estimate of its own location. For example, peering enabled device 1813 can obtain its location information from peering enabled cell phone 1814. This capability can also be advantageously used to limit video presentations. For example, satellite television receivers can receive sports or other transmissions in areas that are supposed to be blacked out. Sporting events are often blacked out by agreement between sports leagues and broadcasters. A satellite television receiver having wireless capability or connected to a WiFi router can request location data from nearby location aware devices such as cell phones and use the information to enforce blackout restrictions or verify that the receiver is in the household it is supposed to be in. This technique can be used for other purposes such as locating stolen property that does have wireless ability but is not location aware.

Figure 21:
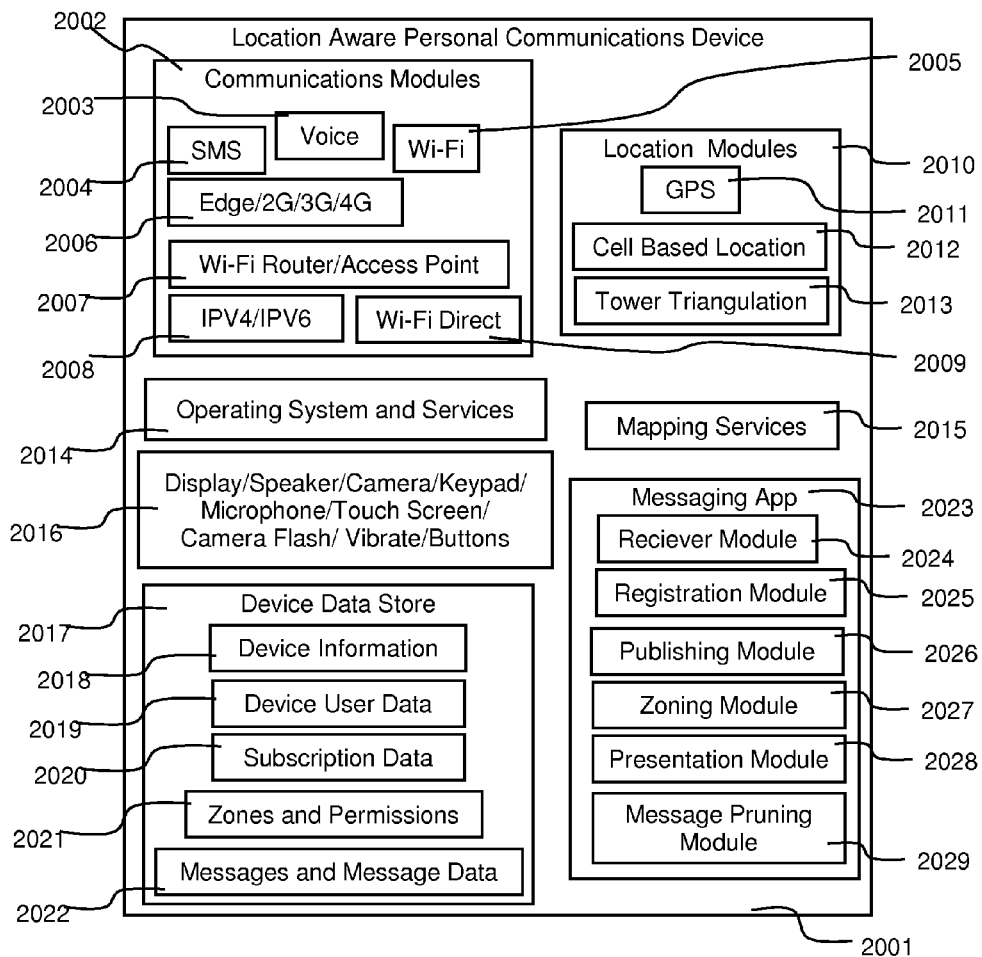
FIG. 21 illustrates a high level diagram of a location aware personal communications device adapted for use with a messaging system in accordance with aspects of the embodiments.

FIG. 21 illustrates a high level diagram of a location aware personal communications device 2001 adapted for use with a messaging system in accordance with aspects of the embodiments. Personal communications devices such as cell phones, tablet computers, etc. can include communications modules 2002 employing a variety of technologies and techniques such as SMS 2004, voice communications 2003, WiFi 2005, cellular telephone data methodologies 2006, internet protocol 2008, WiFi Direct 2009, and WiFi Router or Access point modules 2007. Location modules 2010 such as GPS 2011, Cell-ID or cell based location 2012, or triangulation 2013 can determine where a device is located. A mapping service 2015 can connect to or display map or location information to a person.

Cell phones have operating systems 2014 that provide a variety of services to the cell phone itself for handing its own hardware and to applications (computer programs) running on the cell phone. The hardware can include a display, speakers, camera, keyboard, microphone, touch screen, camera flash, vibrate, buttons, etc. 2014.

The messaging app 2023 is a computer program running on the cell phone (perhaps within a web browser). The messaging app can contain a receiver module 2024 that accepts messages from the messaging service, a registration module 2025 that registers the device with the messaging service, a publishing module 2026 that send messages to the messaging service, a zoning module 2027 that may interact with the mapping service such that a user can define zones, a presentation module 2028 for interactions between the user and the app, and a message pruning module 2029 that can discard messages because the user has left the message's zone, the time period for accepting a zones message isn't active, or for some other reason. The zoning module can also prune zones into which a user is publishing by comparing the message's zone and the users permitted publishing zones.

The device data store 2017 can store app data and device data. Most cell phones have app accessible device information 2018 and information about the device's user or owner 2019. Subscription data 2020 can contain records about the user's subscriptions to messaging services and can also record what zones the user has subscribed to and information about those zone subscriptions. The zones and permissions data 2021 can record zone definitions that the user created or regarding zones the user has interactions with or within. Permissions specify what the user can do with the zones such as publish into, subscribe to, etc. Messages and message data 2022 can contain data regarding messages the device has received, has sent, or is holding pending delivery. A device can hold a message that the user has prepared but not yet published. A device can also hold a message for the user that isn't 'ripe' yet. For example, a user may want messages for a zone but only during work hours. The device may hold a message until it is time for the user to work and then deliver it to the user. Some messages have an expiration time. A message expiring at 6 AM should not be delivered into a zone subscribed to from 8 Am to 5 PM and should be discarded.

A zone can be learned over time by observing a device's movement, presumably as the device owner goes through their daily routine. Many people commute to and from work during the work week, work at a limited number of locations, spend time at home, and have regularly scheduled and located social events (bowling night, kickball, . . . ). A location predictive module can record locations. For example, the module can observe that 90% of the time the cell phone stays within 300 feet of a geographic coordinate during work hours. The likelihood percentage, being above a predetermined threshold, can indicate a zone that the person would like to subscribe to. Similar logging and heuristics can identify the person's commuting route and other regular locations. Predicted zones can be offered for subscription to a person once the zones likelihood passes a predetermined likelihood threshold. Another alternative is that a person may choose for their cell phone to automatically subscribe to zones having a very high likelihood.

One way to determine predicted zones is through hypothesis testing. A minimum zone size and a number of daily short time periods can be selected and a number of hypothesis generated and tested. The person's location at the first time the hypothesis is tested can be the hypothesis locus and the hypothesis can be "will be within size of hypothesis locus". If the hypothesis is true more than a threshold percent of the time after a week or two, then the zone is predicted. If not, the zone size can be increased or a new locus determined. Two prediction zones can be combined to produce a larger zone, particularly if they overlap or share boundaries. For example, the 8:15-8:30 time period shares a time boundary with the 8:30-8:45 time period. If a device's predicted geographic zones for both of these time periods on week days have a high degree of overlap (perhaps 80% or more) then the predicted zones can be joined into a single time zone by joining the time zones and joining the geographic zones. In this manner, people's predictable locations can be inferred and they can be offered subscriptions to zones they are likely to pass through or occupy day to day. Another way to produce prediction zones is to begin with an all times and everywhere zone such that the hypothesis is always true. The zone can be subdivided and each sub zone tested to thereby throw away unlikely zones. An accepted prediction zone can be one with greater than 90% likelihood (an exemplary threshold) and where further subdivision drops the likelihood below the threshold. As shown by the previous examples, prediction zones can be determined by starting small and growing or starting big and shrinking. Established prediction zones can have extinction thresholds such that they are considered unlikely when their likelihood drops below the extinction threshold. In this manner the prediction zones can adapt to a person's changing habits. Note that a sudden large departure (ex. 5 miles or 1 hour) from routine can be detected to generate an alarm message. Stolen cell phones and wayward children can thusly be noticed quickly. Similarly, a location aware automated publisher (or one that obtains its location from a nearby device) with prediction zones can send an alert when it's position diverges from the normal predicted routine.

A message can contain a geographic coordinate. For example, an automated publisher can report the location of a medical emergency or can report its own location when carried out of a geographic zone. An interesting type of zone in this case would be a relative zone. A relative circleZone can have a center, locus, or vertices defined relative to something that moves such as a cell phone or a timed route (a geographic path with a timeline). Another interesting application is to set a relative circleZone to a friend's cell phone with a rule that when friends get too far apart they receive an automatically published message including where to go (the coordinate) and possibly even an arrow display indicating which direction to travel. A group of friends having relative circleZones centered on each other could actually become a real world implementation of the flocking or 'Bolds' algorithm sometimes used as an example of emergent behavior.

A message can include sound. A cell phone can record a spoken message that is then published into a zone. Alternatively, a publisher can include a pre-recorded message in the message payload. Yet another alternative is that the message contains text that is then vocalized by the recipient device's text-to-speech module, services, or API. A text-to-speech module can be optionally provided if the recipient device lacks the capability. Similarly, speech-to-text capabilities can be used to transform a spoken message into text that is then published into a zone.

Another source of sounds is a voice call or voice message. Current technology notification systems make phone calls to lists of phone numbers (robo-call). One of those phone numbers can be a messaging system that takes the voice message and automatically publishes it to a geographic zone. In this manner, legacy clients of the robo-caller receive the voice message as a phone call whereas subscribers of the messaging system can receive a data message containing the voice message.

Similarly, a publisher can call in an input message over the phone system. The messaging system can have a unique phone number for each publisher and zone. The messaging system can also determine the publisher and publication zone with methods including voice recognition, speech recognition, queries and authentication, and caller Id. For example, the messaging system can recognize the voice or Caller Id number to recognize the person and can use speech recognition to determine a zone ("within a mile of copper ave. and tin st." can currently be understood by a variety of currently offered services such as those helping people find gas stations etc.). A caller can also be required to enter or speak a code to thereby be authorized to publish into a zone. Note that the techniques for individuals calling in can also be used when a robo-caller is calling in. The messaging system can immediately send the message to a person for approval (an escalation scenario). This is particularly important in the robo-caller example because dropped or noisy phone connections can garble the recorded phone message.

A distinction must be made here between phone messages and messages as used within the messaging system. To give a phone message, a caller, either machine or person submits a phone number to the telephone system, waits for the callee to answer, gives the message, and then hangs up. Essentially, phone messages are compatible with 1920s era telephone equipment. The person receiving the call has to answer the phone to receive the message or can listen to it later on an answering machine or voice mail service that answered the call. Phone messages are transmitted continuously at a rate required for human perception and conversation. This is in contrast to a messaging system that uses data networks. The messaging system sends the message as data to the cell phone without anyone or anything answering the phone. Unlike a phone call, the entire message can be received in milliseconds or can be buffered and assembled over a matter of minutes. A phone call cuts out or sounds unintelligible when the connection is bad. A phone call stops when the connection drops. Data networks operate differently. Noisy data connections can cause slower transmission or retransmission but the message sent is the message received. A dropped connection (for a connection based network protocol like TCP) results in automatic reconnection. Data can be sent and received while other data is being sent and received. A person is using a cell phone as a telephone does not prevent a message from being received through a data connection. A published message can be received and stored pending user action or can be automatically presented. When automatically presented, the cell phone can simply present the message as soon as it is received. A text message can be automatically converted to speech and played. Contrast this to a phone call wherein the user must answer a ringing phone before hearing the message.

A message can contain an image. A cell phone with a camera can produce the image or the image can be obtained from another source. For example, a digital or digitized image of a child can be included in an 'Amber Alert' that is published to all the recipients within a store, shopping mall, or neighborhood. Similar but presumably less strident messages can be published for lost pets where neighbors subscribe to neighborly zones.

A message can contain video data. A cell phone with camera and/or microphone can produce the video or the video can be obtained from another source. A video of a possibly lost child can be published into an 'Amber Alert' zone. A video of an aircraft over the Nevada desert can be published to an 'Area 51' zone having subscribers all over the world. Such a video would ideally also contain geographic coordinates and the direction the camera is facing.

The global positioning system (GPS) is a system for determining earth locations. Those locations can be specified with a number of different geographic coordinate systems. This document uses the terms GPS coordinate, location, locus, place, geographic coordinate, and coordinate interchangeably to mean a specification of a location. The locations are generally considered to be earth locations, but need not be. For example, a message can be published into a volumetric zone containing an astronomical event. Note that volumetric zones can be 3 dimensional extensions or extrusions of the 2 dimensional geographic zones discussed thus far. Square becomes cube, circle becomes sphere (extension) or cylinder (extrusion), etc.

Embodiments can be implemented in the context of modules. In the computer programming arts, a module can be implemented as hardware or as computer hardware adapted to process a collection of routines and data structures that perform particular tasks or implements a particular abstract data type. Modules generally can be composed of two parts. First, a software module may list the constants, data types, variable, routines and the like that that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein can refer to hardware of software modules or implementations thereof. Such modules can be utilized separately or together to form a program product that can be implemented through signal-bearing media, including transmission media and recordable media.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A messaging system that communicates with a plurality of location aware personal communications devices each carried by a person, the messaging system comprising:
    a database comprising a plurality of zone specifications and a plurality of device records;
    a device registration module wherein the location aware personal communications devices each communicate wirelessly and automatically supply device identification information and location information to the device registration module and wherein the device identification information is stored in the device records to thereby automatically register the location aware personal communications devices with the messaging system;
    a message reception module wherein the messaging system accepts an input text video or audio message from a publisher into their location aware personal device, the publisher setting the publication zone, wherein the input message comprises a payload and publication zone data specifying at least one publication zone and wherein every publication zone is a geographic area;
    a message targeting module that selects a plurality of recipient devices from the device records, wherein the recipient devices are located inside of the at least one publication zone; and
    a message publication module that sends a published message comprising the payload to the recipient devices to thereby pass the payload to a plurality of human recipients wherein each human recipient is carrying at least one of the recipient devices, wherein the database comprises permission specifications wherein the publisher is restricted to directing messages only to at least one permitted zone, wherein the publication zone is not geographically the same as the permitted zone, the at least one publication zone that was set by the publisher intersects the at least one permitted zone, and wherein one of the location aware personal communications devices located inside the permitted zone that is unable to wirelessly connect to the messaging system connects to the messaging system by way of another one of the location aware personal communications devices located within the publication zone based on the another one of the location aware personal communications devices enabling the connection and wirelessly routing the published message to the one of the location aware personal communications devices located inside the permitted zone.

2. The messaging system of claim 1 wherein the publisher uses one of the location aware personal communications devices to send the input message to the messaging system.

3. The messaging system of claim 1, further comprising a plurality of subscriber specifications, wherein a plurality of subscribers subscribe to a plurality of subscription zones, wherein each subscription zone is also a geographic zone, wherein the published message is also sent to subscribers subscribing to subscription zones intersecting the at least one publication zone, and wherein at least one of the subscribers to whom the published message is sent is not located within any of the at least one publication zone.

4. The messaging system of claim 1 further comprising a broadcasting subsystem that broadcasts a broadcast message to a plurality of broadcast capable devices wherein the broadcast capable devices are those of the location aware personal communications devices that can receive broadcasts, wherein each of the broadcast capable devices is located at one of a plurality of geographic locations wherein the broadcast message comprises the payload and targeting data derived from the publication zone data, and wherein each one of the broadcast capable devices comprise a zone filtering module that filters out broadcast messages based on the targeting data and the geographic location of the each one of the broadcast capable devices.

5. The messaging system of claim 1 further comprising:
    a plurality of subscriber specifications wherein a plurality of subscribers subscribe to a plurality of subscription zones, wherein each subscription zone is also a geographic zone, wherein the published message is also sent to subscribers subscribing to subscription zones intersecting the at least one publication zone, wherein each one of a plurality of subscribers is associated with at least one of the location aware personal communications devices or with at least one device configured to receive messages from the messaging system;
    a broadcasting subsystem that broadcasts a broadcast message to a plurality of broadcast capable devices wherein the broadcast capable devices are those of the location aware personal communications devices that can receive broadcasts, wherein the broadcast message comprises the payload and targeting data derived from the publication zone data, and wherein the broadcast capable devices comprise a zone filtering module that filters out broadcast messages based on the targeting data; and
    wherein the publisher uses one of the location aware personal communications devices to send the input message to the messaging system, wherein the database comprises permission specifications, wherein the publisher is restricted to directing messages only to at least one permitted zone and wherein the at least one publication zone intersects the at least one permitted zone.

6. The messaging system of claim 1 wherein the other one of the location aware personal communications devices is located outside the publication zone.

* * * * *